US008600795B2

(12) United States Patent
Birr

(10) Patent No.: US 8,600,795 B2
(45) Date of Patent: Dec. 3, 2013

(54) SYSTEM AND METHOD FOR FILTERING, DISTRIBUTING AND ROUTING SALES LEADS

(75) Inventor: Kelly Birr, Redmond, WA (US)

(73) Assignee: Imprezzio, Inc, Spokane, WA (US)

( * ) Notice: Subject to any disclaimer, the term of this patent is extended or adjusted under 35 U.S.C. 154(b) by 181 days.

(21) Appl. No.: 13/095,573

(22) Filed: Apr. 27, 2011

(65) Prior Publication Data

US 2011/0264479 A1  Oct. 27, 2011

Related U.S. Application Data

(60) Provisional application No. 61/328,433, filed on Apr. 27, 2010.

(51) Int. Cl.
*G06Q 30/00* (2012.01)
*G06Q 10/00* (2012.01)

(52) U.S. Cl.
USPC ........ 705/7.29; 705/7.14; 705/7.31; 705/7.33

(58) Field of Classification Search
USPC ............................... 705/7.14, 7.29, 7.31, 7.33
See application file for complete search history.

(56) References Cited

U.S. PATENT DOCUMENTS

| 2003/0229504 | A1* | 12/2003 | Hollister | 705/1 |
| 2004/0143484 | A1* | 7/2004 | Kapadia et al. | 705/10 |
| 2008/0228544 | A1* | 9/2008 | Woosley et al. | 705/8 |
| 2009/0138378 | A1* | 5/2009 | Suba et al. | 705/27 |
| 2009/0216552 | A1* | 8/2009 | Watrous | 705/1 |
| 2011/0196716 | A1* | 8/2011 | Srinivasan et al. | 705/7.29 |
| 2011/0225082 | A1* | 9/2011 | Diana et al. | 705/37 |

OTHER PUBLICATIONS

Greco, The Rating Game: grade your leads to clear the pipe dreams from your sales pipeline, Inc., vol. 20, No. 1, Jan 1998, p. 93(2).*
Griggs, Give us Leads! Give us Leads!, Sales and Marketing Management, Jul. 1997, p. 67-72.*
www.lendingtree.com.
www.netquote.com.

* cited by examiner

*Primary Examiner* — Justin M Pats
(74) *Attorney, Agent, or Firm* — Wolfe-SBMC

(57) ABSTRACT

A system and method of managing leads by filtering, distributing and routing leads to a representative using business intelligence.

20 Claims, 1 Drawing Sheet

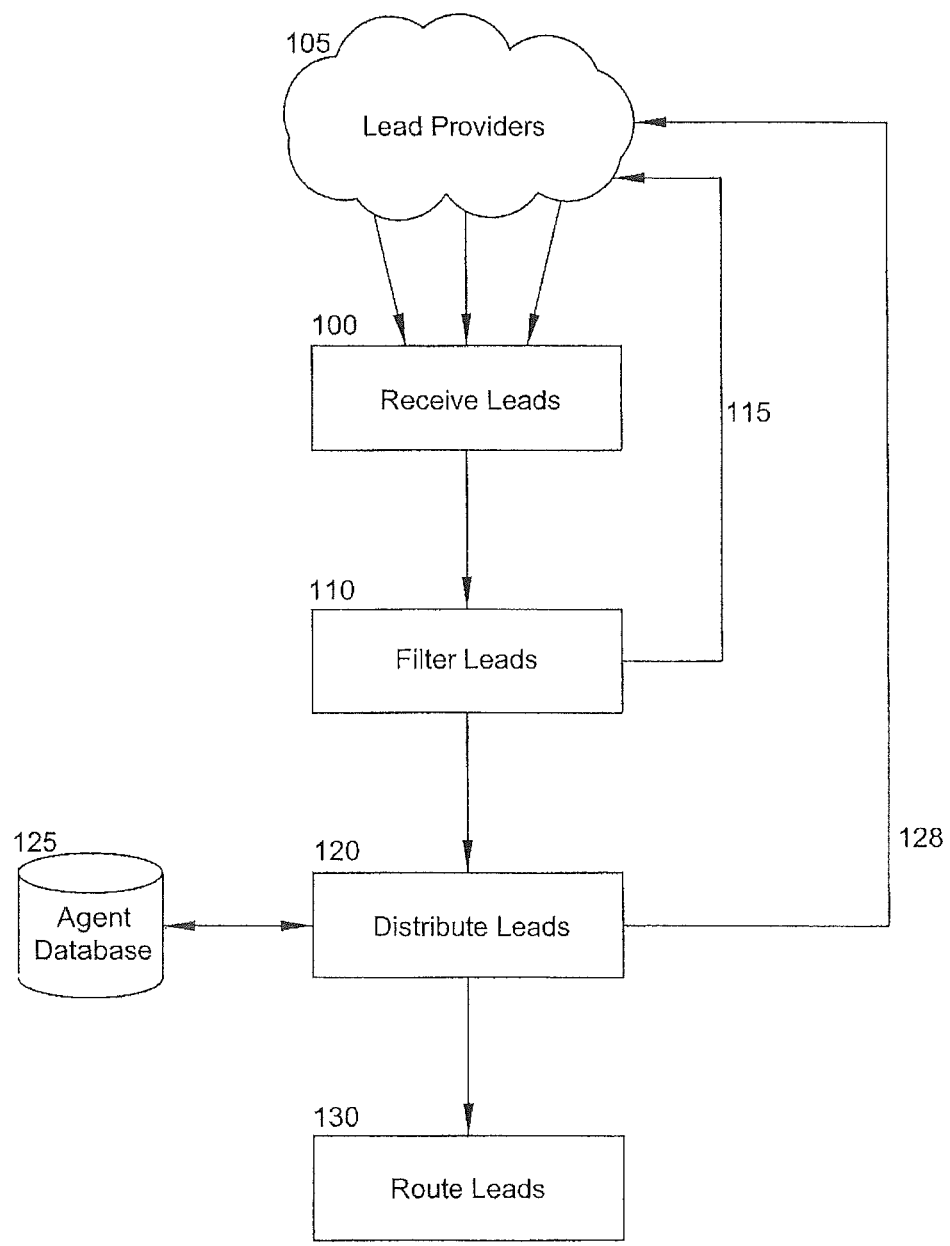

SYSTEM AND METHOD FOR FILTERING, DISTRIBUTING AND ROUTING SALES LEADS

The present application claims the priority of U.S. Provisional Patent Application No. 61/328,433 filed on Mar. 27, 2010, the disclosure of which is incorporated by reference herein.

The present application is directed to a system and method for filtering, distributing and routing of leads. Although some of the embodiments in the present application describe the management of sales leads for insurance services, the principles described herein are equally applicable to any type of lead that identifies a potential recipient of goods, services or opportunities.

BACKGROUND

In a competitive sales market, many independent sales organizations will complete for the same sales "leads". These leads represent the names and contact information of individuals or organizations that may be interested in their products or services. One of the newest and most popular forms of sales lead is the "Internet Lead"; these leads come from websites offering to give consumers competing quotes from companies for the product or service that the customer is interested in. The leads are then sold to the sales organizations for what is usually a fixed fee and delivered electronically, often via email. One of the first examples of this model is from lendingtree.com® who offers to give consumers competing quotes for loans from up to four banks if they submit an online financing application. What lendingtree.com and similar organizations actually do is simply sell all the information collected to mortgage brokers based on the highest bidder for that consumer's preferred loan type and geographic location. Another example, in the insurance industry, is from NetQuote.com®. Its business model is virtually identical to that of lending tree's, except it deals in leads for insurance quotes. There are numerous other entities that provide Internet leads in numerous industries. For a smaller sales organization, it will often buy from one or two lead sources and simply use the online tools available to it from those lead providers. It will also usually have its leads delivered by email. Larger organizations may buy from one or more providers and may also have the leads delivered directly to an in-house data management system, e.g., customer relationship management (CRM), using an Application Programming Interface (API). The actual network protocol or data format for this transmission varies but will commonly resemble XML posted over HTTP(s). There are several problems with prior art lead referral systems that receive leads from multiple sources (providers) and distribute them to multiple sales representatives via whatever means possible for follow-up and prosecution of the leads. The term representative as used in this application not only applies to sales representatives, but to any individual or entity who uses the lead to follow-up and identify potential recipients for the goods, services or opportunities being offered. The representatives may all be employed by the same entity, or may be competing against each other. The representatives may be affiliated with a single provider of the leads or may receive leads from many different lead providers. The representative may also be a separate sales entity unrelated to the processor or provider of the sales leads.

One problem in prior art systems is the duplication of leads received from the lead providers. In a competitive industry, many lead providers buy-and-sell leads amongst themselves and resell them to sales organizations in accordance with existing contracts. While their internal exchange protocols make every effort to prevent the selling of duplicated leads to a single sales organization or to multiple independent "agents" of a single parent organization, the prior art systems are imperfect and duplication is commonplace.

Another problem is the identification of "bad" leads. It's not uncommon for individuals to volunteer false information on these "get a quote" websites, hoping simply to receive an automated and impersonal quote response. This supplying of false information results in "bad leads" which are unusable to an actual salesperson to follow-up on. Prior art systems do not adequately identify bad leads.

Another problem with prior art systems is the identification of unwanted leads. While most lead provider request certain criteria and "profile" information from the sales organizations when activating their account, this information is often generic and not specifically tailored to the individual clients needs. This results in the sales organization receiving and being charged for leads they don't actually want.

For example an insurance agent may desire to only provide quotes to drivers with very clean driving records. However, the lead provider may not be able to identify drivers who are unsuitable, e.g., drivers with multiple DUIs. Thus, while the name and contact information on a leads may be correct, the lead is of no use to the agent as he/she cannot give this individual a quote or gain any business from it.

Yet another common problem for larger organizations is the distribution of leads identifying existing customers. This is especially problematic in organizations with independent contractor sales representatives who receive ongoing commissions for maintaining customer relationships. Continuing with the insurance company example, "Big Mutual Insurance" needs a way to ensure that if it purchases a lead that is already a policy holder, it can route that lead to the independent agent who manages that policy or it may be in violation of that agent's contract for sending her client to competing agent.

Another problem is the fair distribution of the leads in the sales organization. When a large company wants to purchase leads and distribute them to their independent representative, it must first identify which representatives may be eligible to receive the lead. The process of identifying eligible sales representatives is multi-faceted and typically has been handled manually in prior art systems. In addition, once the eligible representatives are identified, prior art systems do not provide an automated solution for fairly distributing the leads among the eligible representatives.

Prior art systems do not provide a comprehensive solution that addresses each of the problems identified above. There are some individual components that are directed to some of the problems above, but they are not specifically tailored to the entire Internet lead life cycle from generation through filtering, distribution and routing as described in the present application.

SUMMARY OF THE DISCLOSURE

The present disclosure is directed to a Filter-Distribution-Routing (FDR) solution for leads that addresses each of the problems identified above. It provides a full pipeline process consisting of four stages that allows a sales organizing to manage the inbound and outbound flow of its leads, control costs, and limit exposure to liabilities.

BRIEF DESCRIPTION OF THE DRAWINGS

FIG. 1 is a top level flow chart of one embodiment of the present disclosure.

DETAILED DESCRIPTION OF THE DRAWINGS

With reference to FIG. 1, the $1^{st}$ stage is for the leads to be received by the system into the "entry point" 100. This may happen in multiple ways but they are typically electric data-transmission from the lead providers 105. The most common commercial use will be for an XML data document containing the lead information to be posted to the FDR system by the provider(s) over the HTTPS secure protocol. Other common methods include; scraping provider emails, SOAP Web Services, FTP of files with pre-arranged format.

The lead providers 105 are normally provided with some guidelines for which the leads should qualify in order that only relevant sales leads are provided. However, in practice, the ability of the lead providers to satisfy such guidelines is inadequate. The present disclosure uses a dynamic filtering process to select appropriate criteria to validate the leads received from the provider. The $2^{nd}$ stage is to filter the leads 110 based on the data received from the provider in the first step 100 using the criteria that has been established by the sales organization for the type of particular lead received. A common filter set for an insurance lead (for example) would check: street address correctness, email deliverability, phone number (area+prefix), presence of one or more insurable drivers (based on underwriting criteria) and presence of one or more insurable vehicles (also based on underwriting criteria). The actual criteria are flexible and based on the "nodes" of data provided and the acceptable value ranged defined for a particular type of lead. For example, a lead can be classified by type of lead, and the predetermined criteria can be selected as a function of the classification of the lead. For example, criteria for a lead for a mortgage loan may include street address correctness, email deliverability, phone number (area+prefix), property address subject to the mortgage, occupation and income range of the mortgage applicant. For an employment application, the predetermined criteria may include street address correctness, email deliverability, phone number (area+prefix), type of employment, geographical location of potential employment, desired position, desired salary range and desired employment hours. Each lead can then be scored for compliance with the selected predetermined criteria, and each lead whose cumulative score does not exceed some predetermined threshold can be rejected. For example, address and phone numbers can be matched to national databases to determine validity. E-mail addresses can be monitored and checked to see if they are operational. Standard data-hygiene processes are also put in place to validate and correct issues with names, address, phone numbers, etc. The criteria and the thresholds to be used can be predetermined and can be selectable. In one embodiment, the criteria evaluated and the threshold may be selected based on historical analysis of previously received leads. A failure of the lead to meet minimum criteria at this stage will result in the lead being "rejected". By way of example, each type of lead may identify required fields of information. For each field that includes the required information a score can be incremented for the lead such that leads containing more required information is scored higher than a lead having less required information.

The selectable criteria can also incorporate business rules. In one embodiment, software script written in a programming language, such as Python, can be used to evaluate a lead for business rule validation. For example, if an insurance provider is seeking potential automobile customers with less than stellar driving records, a script can be written which validates leads for drivers having not more than two driving under the influence (DUI) infractions. By way of another example, software script based criteria can be used to identify potential parking permits for a customer within a predefined distance from a geographic location and within a predefined price range Another predetermined criteria can be used to filter leads that represent existing customers or identify potential recipients of goods or services that have a pre-existing relationship with the provider for goods or services. In one embodiment, a memory device identifying existing clients or existing relationships can be used to filter leads to minimize interference with these pre-existing relationships.

However, identification of a rejected lead is only one aspect of the disclosure. It is also important that a mechanism exists so that the lead provider does not receive compensation for a rejected lead. In one embodiment, a message flows back up the pipeline 115 to the lead provider 105 informing them that the sales organization is not interested in the rejected lead and should not be billed for it. If the lead passes the filtering stage, it moves on to the next stage in the pipeline.

The $3^{rd}$ stage is to distribute the lead to a sales representative or "agent" 120. This step may be bypassed if the provider specifies the intended recipient in the posted data; however, this is often not the case for large organizations with volume purchase programs. The process of distribution is two-fold; identification of qualified representatives and fair allocation of the leads to the qualified representatives. First, the system uses the data provided on the lead and the information contained in its "agent database" 125 (the format or storage medium of this database is irrelevant so long as it's electronic and queryable) to identify a list of one or more agents who qualify to receive the lead. In one embodiment, qualification can be determined by geographic region, product/line of business, licensing of the agent, and individual preferences including quantity limits. An example would be a lead for a fire insurance quote on a Spanish speaking man from Southern California. In order to qualify to receive this lead, the following criteria may be used: the agent must have an office in southern California, (within 30 miles of the applicant), be licensed to sell fire insurance in California and must speak Spanish or have a licensed staff person who does. Any agent not meeting this criteria or those that meet the criteria but are over their defined daily or weekly maximum (other maximum are also possible) would be excluded. In one embodiment, compliance with this criteria can be scored and all representatives whose cumulative score exceeds a predetermined threshold can be deemed to be "qualified" to receive the lead. If no representatives are deemed to be qualified, then the lead may be "rejected." In such a case, a message flows back up the pipeline 128 and to the provider informing them that the sales organization is not interested in this lead and should not be billed for it. The criteria can be predetermined and be selectable as a function of the type of lead.

After one or more qualifying representatives are identified, then the system will proceed to phase two of distribution where the leads are distributed to the representatives "fairly". Common distribution implementations can include round-robin, fewest leads received, most-likely to-sell or similar algorithms. The most likely to sell algorithm can be based on historical performance of the qualified representatives. Multiple methods are supported and the process is flexible as how exactly the recipient is chosen. In one embodiment the distribution is based on the "fewest leads received" with the qualified representatives being dynamically ranked in order of number of leads received with the fewest leads moving up to the top of the ranking. In another embodiment, the agents may be ranked according to dynamic criteria, time since received last lead.

After the qualified representative is selected to receive a lead, the relevant "representative identification" may be tagged onto the package of data containing the sale lead which will then be routed to the selected representative in the next stage. Other information as well can be appended to the lead data to facilitate routing and delivery of the lead. In one embodiment, the identification of a specific CRM system for a representative can be identified to facilitate automated processing of the lead by the representative. In another embodiment, information related to the quality of the lead can be provided with the lead. For example, if the leads have an associated score presenting the level of compliance with the predetermined criteria, the score of the lead can be provided with the lead as an indication of the quality of the lead. The routing algorithm can address leads for a single representative to different addresses based on this quality score so that different processes can be performed for the lead as a function of quality. In another embodiment language information can included with a lead to indicate the spoken language of the potential customer which can be used to route the lead according to a language specific protocol.

The routing stage 130 determines which methods of delivery are available to get the lead to the selected qualified representative. The lead can be delivered based on system availability and identified criteria. The lead can be routed to the representative individually (e.g., via e-mail) or can be routed to a processing system for automatic follow-up with the potential lead.

For example, an insurance agent receiving a fire insurance lead (described in stage 3) can receive leads via e-mail or a direct push to his company CRM system. In one embodiment, he may also have an after-hours calling service that automatically takes his leads and calls them outside of business hours. The system will see that this lead came in during business hours so it will not deliver it to the after-hours calling service. In one embodiment, it may try sending the lead for predetermined number of attempts or for a predetermined period of time. The lead can be sent directly to the CRM system or the agent's e-mail. The system may have primary and alternate routing means so that the routing system will always try find at least one way to deliver the lead and does not cause leads to be "rejected" back to the provider.

The use of a CRM system allows the generation of customizable reports and the tracking of leads. The tracking of leads can provide historical information which can then be used to establish criteria and predetermined thresholds to validate leads and qualify representatives.

Thus, unlike prior art systems, the present disclosure interfaces the filtering, distributing and routing of leads using business intelligence to maximize the potential success of generating business form the leads. In addition, unlike prior art systems which provide a "garbage-in garbage out" processing scheme, the present disclosure enhance the value of a lead through dynamic filtering can append additional information to the lead to facilitate efficient distribution and routing of the lead.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

What is claimed:

1. A computer-implemented method of managing leads, comprising:
   receiving a plurality of leads from a lead provider;
   classifying each lead by a type of each lead;
   selecting a first criteria as a function of the classification of each lead, the first criteria defining one or more data fields and an acceptable value range for information in each of the one or more data fields in each lead;
   comparing, by a processor, each lead against the selected first criteria and assigning a lead score to each lead as a function of compliance with the first criteria, the assigning the lead score comprising incrementing the lead score for each data field in each lead that includes information that is within the acceptable value range;
   accepting a subset of the plurality of leads based on the assigned lead score of each lead of subset of accepted leads exceeding a first predetermined threshold;
   rejecting at least one lead of the plurality of leads based on the assigned lead score of the rejected lead being less than the first predetermined threshold, and transmitting a first message to the lead provider informing the lead provider that the rejected lead is rejected, the first message causing the lead provider to not bill for the rejected lead;
   accessing a memory device identifying available representatives;
   for each lead of the subset of accepted leads:
      selecting a second criteria as a function of a respective one of the subset of accepted leads;
      comparing the available representatives against the second criteria and assigning a representative score to each available representative as a function of compliance of the available representative with the second criteria;
      qualifying a representative if the representative score exceeds a second predetermined threshold;
      if one or more of the available representatives are qualified, selecting one of the one or more qualified representatives as a function of a distribution algorithm, and distributing the respective one of the subset of accepted leads to the selected representative; and
      if there are no available representatives that are qualified, rejecting the respective one of the subset of accepted leads and transmitting a second message to the lead provider informing the lead provider that the respective one of the subset of accepted leads is rejected, the second message causing the lead provider to not bill for the respective one of the subset of accepted leads;
   wherein for at least one lead of the subset of accepted leads, the method determines that one or more of the available representatives are qualified, and for at least another lead of the subset of accepted leads, the method determines that there are no available representatives that are qualified.

2. The computer-implemented method of claim 1, wherein the type of lead includes at least one of insurance, consumer loan, mortgage loan, housing rental, or parking permit.

3. The computer-implemented method of claim 1, wherein the first criteria includes at least one of a valid home address, a valid telephone number, or a valid e-mail address.

4. The computer-implemented method of claim 1, wherein the second criteria include at least one of language spoken, geographic area, or representative's license.

5. The computer-implemented method of claim 1, wherein the first predetermined threshold is based on historical information.

6. The computer-implemented method of claim 1, wherein the second predetermined threshold is based on historical information.

7. The computer-implemented method of claim 1, wherein the distribution algorithm is at least one of round-robin, fewest leads received, or most-likely to-sell.

8. The computer-implemented method of claim 1, wherein the distributing includes electronic transmission of the lead to the selected representative.

9. The computer-implemented method of claim 1, wherein the selecting one of the one or more qualified representatives includes appending an identifier associated with the selected representative to the lead.

10. A computer-implemented method of managing leads, comprising:
  receiving a plurality of internet leads from a lead provider;
  assigning a lead score to each lead by incrementing the lead score for each data field in each lead that includes information that is within an acceptable value range defined by a first predetermined criteria;
  filtering, by a processor, each lead by comparing the assigned lead score of each lead against the first predetermined criteria and accepting a subset of the plurality of leads based on the assigned lead score of each lead of the subset of accepted leads exceeding a predetermined threshold;
  rejecting at least one lead of the plurality of leads based on the assigned lead score of the rejected lead being below the predetermined threshold and transmitting a first message informing the lead provider that the rejected lead is rejected, the first message causing the lead provider to not bill for the rejected lead;
  for each lead of the subset of accepted leads:
    determining whether one or more representatives are qualified to receive a respective one of the subset of accepted leads as a function of a second predetermined criteria, which is a function of the respective one of the subset of accepted leads;
    if no representatives are qualified to receive the respective one of the subset of accepted leads, rejecting the respective one of the subset of accepted leads and transmitting a second message informing the lead provider that the respective one of the subset of accepted leads is rejected, the second message causing the lead provider to not bill for the respective one of the subset of accepted leads;
    if one or more representatives are qualified to receive the respective one of the subset of accepted leads, selecting one of the one or more qualified representatives to receive the respective one of the subset of accepted leads as a function of a third predetermined criteria;
    associating an identifier with the respective one of the subset of accepted leads as a function of the selected representative; and
    electronically transmitting the respective one of the subset of accepted leads to the selected representative using the associated identifier;
  wherein for at least one lead of the subset of accepted leads, the method determines that one or more of the available representatives are qualified to receive the at least one lead, and for at least another lead of the subset of accepted leads, the method determines that there are no available representatives that are qualified to receive the at least another lead.

11. The computer-implemented method of claim 10, wherein the first predetermined criteria is selectable based on the type of lead.

12. The computer-implemented method of claim 10, wherein the second predetermined criteria is selectable based on the skills of the one or more representatives.

13. The computer-implemented method of claim 10, wherein the third predetermined criteria is selectable based on evenly distributing leads to the one or more representatives.

14. The computer-implemented method of claim 10, wherein the associated identifier includes at least one of an e-mail address, an Internet Protocol address, a text address, or an identifier associated with a CRM system.

15. A non-transitory computer readable storage device comprising computer readable program code stored thereon that, responsive to execution by a processor, performs operations comprising:
  receiving a plurality of internet leads from a lead provider;
  assigning a lead score to each lead by incrementing the lead score for each data field in each lead that includes information that is within an acceptable value range defined by a first predetermined criteria;
  filtering each lead by comparing the assigned lead score of each lead against the first predetermined criteria and accepting a subset of the plurality of leads based on the assigned lead score of each lead of subset of accepted leads exceeding a predetermined threshold;
  rejecting at least one lead of the plurality of leads based on the assigned lead score of the rejected lead being below the predetermined threshold and transmitting a first message informing the lead provider that the rejected lead is rejected, the first message causing the lead provider to not bill for the rejected lead;
  for each lead of the subset of accepted leads:
    determining whether one or more representatives are qualified to receive a respective one of the subset of accepted leads as a function of a second predetermined criteria, which is a function of the respective one of the subset of accepted leads;
    if no representatives are qualified to receive the respective one of the subset of accepted leads, rejecting the respective one of the subset of accepted leads and transmitting a second message informing the lead provider that the respective one of the subset of accepted leads is rejected, the second message causing the lead provider to not bill for the respective one of the subset of accepted leads;
    if one or more representatives are qualified to receive the respective one of the subset of accepted leads, selecting one of the one or more qualified representatives to receive the respective one of the subset of accepted leads as a function of a third predetermined criteria;
    associating an identifier with the respective one of the subset of accepted leads as a function of the selected representative; and
    electronically transmitting the respective one of the subset of accepted leads to the selected representative using the associated identifier;
  wherein for at least one lead of the subset of accepted leads, the operations include determining that one or more of the available representatives are qualified to receive the at least one lead, and for at least another lead of the subset of accepted leads, the operations include determining that there are no available representatives that are qualified to receive the at least another lead.

16. The non-transitory computer readable storage device of claim 15, wherein the first predetermined criteria is selectable based on the type of lead.

17. The non-transitory computer readable storage device of claim 15, wherein the second predetermined criteria is selectable based on the skills of the one or more representatives.

18. The non-transitory computer readable storage device of claim 15, wherein the third predetermined criteria is selectable based on evenly distributing leads to the one or more representatives.

19. The non-transitory computer readable storage device of claim 15, wherein the associated identifier includes at least one of an e-mail address, an Internet Protocol address, a text address, or an identifier associated with a CRM system.

20. The non-transitory computer readable storage device of claim 15, wherein the lead relates to at least one of insurance, consumer loan, mortgage loan, housing rental, or a parking permit.

* * * * *